Dec. 15, 1931.  W. A. GIBBS  1,837,122
CLEAR VISION DEVICE
Filed April 8, 1926
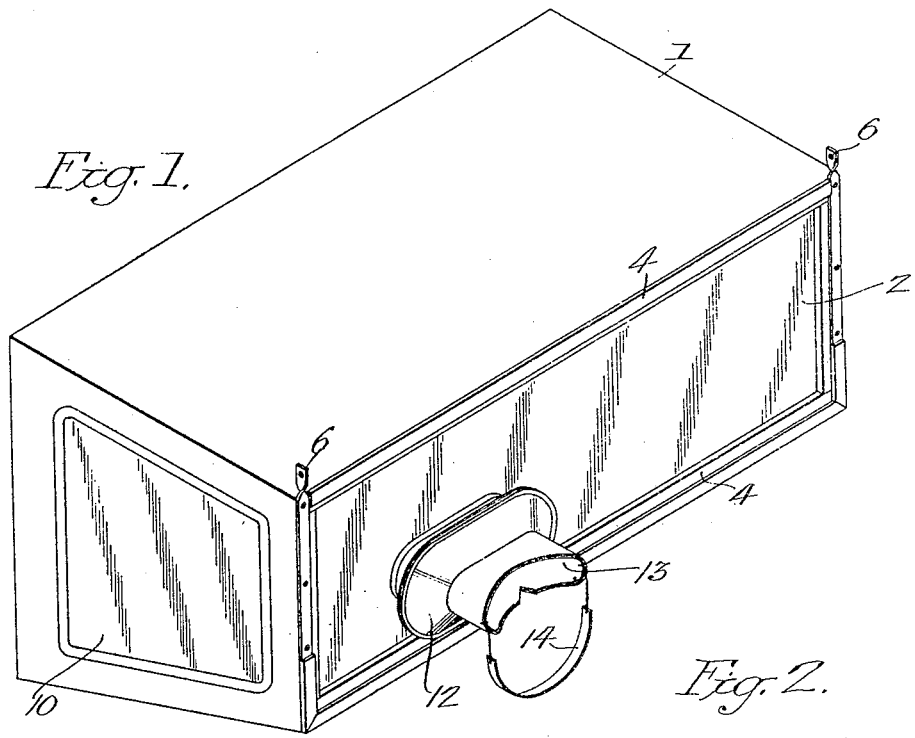
Fig. 1.
Fig. 2.
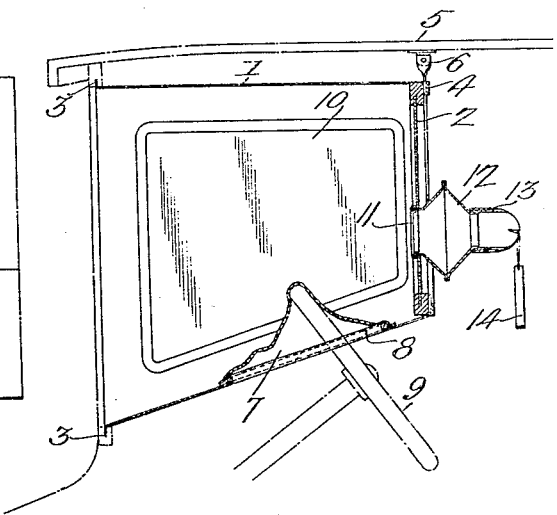
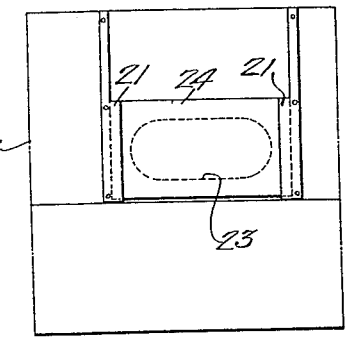
Fig. 5.
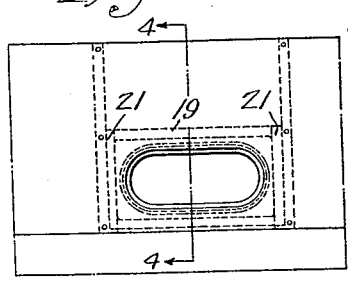
Fig. 3.
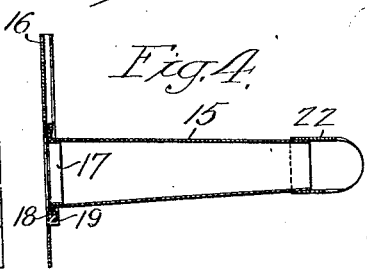
Fig. 4.
Inventor.—
Walter H. Gibbs.
by his Attorneys,
Trowson + Trowson Patented Dec. 15, 1931

1,837,122

UNITED STATES PATENT OFFICE

WALTER A. GIBBS, OF HOLLYOAK, DELAWARE

CLEAR VISION DEVICE

Application filed April 8, 1926. Serial No. 100,668.

The principal object of this invention is to provide a novel and advantageous device for affording clear vision for the operator or occupants of transportation vehicles, boats and the like.

More specifically an object of the invention is to provide means for affording a clear and unobstructed view from behind a windshield or other obstruction beyond which it may be desired to see.

A further object of the invention is to provide clear vision means so constructed that while affording the unobstructed view, still prevents the passage of air currents, rain, snow and the like behind the windshield or other obstruction in connection with which the clear vision device is employed.

A still further object of the invention is to provide clear vision means for use in connection with windshields so constructed as to permit removal of the apparatus and restoration of the windshield to its normal form.

The invention further contemplates the use of a vision tube extending between the windshield or other obstruction and the eyes of the operator, and of means for compensating the unavoidable relative movement between the head of the operator and the windshield.

Another object is to provide means for preventing undue limitations in the field of vision while using the clear vision apparatus.

The invention further contemplates the provision of means for transferring the windshield of a motor vehicle inwardly towards the driver's seat so that a relatively small opening in the windshield provides a relatively wide range of vision through said opening from the operator's position.

These and other objects appearing hereinafter I accomplish by means of devices such for example as illustrated in the attached drawings, in which:

Figure 1 is a detached perspective of a device made in accordance with my invention;

Fig. 2 is a fragmentary and more or less diagrammatic side view illustrating the manner in which the device is attached to a motor vehicle;

Fig. 3 is a view of a modified form of the invention as seen from in front of the windshield;

Fig. 4 is a section on the line 4—4, Fig. 3, and

Fig. 5 is a view from the inside of the windshield after the clear vision device illustrated in Figs. 3 and 4 has been detached and the windshield opening closed.

In many instances, and particularly in foggy or misty weather, considerable difficulty is experienced in obtaining a clear and unobstructed view through the ordinary windshields of motor vehicles, boats and the like, due to the formation of a film of moisture on the surface of the shield and the loss of light through the glass. Difficulty is also experienced at times due to the reflection from the glass of the shield. I have found it possible to entirely eliminate these defects of vision while at the same time enjoying almost without modification the full advantages of the windshield protection.

My device consists essentially in forming an opening in the shield, located with respect to the observer's position behind the shield, so as to afford an unobstructed view therethrough. In order to prevent the entrance of moisture, wind, dirt or the like through the opening, I provide a tube or vision passage extending from the opening inwardly to the head of the observer, together with means for securing the ends of said passage securely at the edges of said opening and also snugly around the eyes of the observer so that the joints at the end of the tube are substantially tight ones effectively preventing the passage of any substantial quantities of air. I have found that with this device, by reason of the dead end nature of the tube, there is slight tendency for dirt or cinders to enter the tube even when in motion, so that the device affords an absolutely unobstructed view to the operator with practically full shield protection.

In general, I have found it desirable to carry the shield comparatively close to the position of the observer and closer than it is customary to place these shields in the standard automobile construction. This may be done in numerous ways, and there is to be no limitation as to the structural details by means of which the desired result is obtained. As applied to motor vehicles, one embodiment of my invention is illustrated in Figs. 1 and 2 of the attached drawings, in which the reference numeral 1 designates a substantially rectangular hood which carries at one side a transparent shield 2, preferably of glass, and whose opposite side is open so that the free edges at that side may be secured in the frame 3 at the front of the vehicle normally provided for the windshield. The hood 1 is preferably made of leather, fabric or similar material, and the frame 4 which supports the shield 2 may be suspended from the roof 5 of the vehicle, see Fig. 2, by means of suitable brackets 6 at the sides of the frame. In the present instance, a recess 7 is provided in the bottom of the hood 1, surrounded in the present case by a rigid hoop 8, for reception of the upper part of the steering wheel 9 of the vehicle. In this instance also I prefer, in order to increase the range of vision and to prevent serious obstruction by the hood 1, to provide the latter at each side with a transparent window 10.

It will be apparent that by this means the transparent shield 2 corresponding to the windshield of the normal vehicle construction is brought considerably closer to the occupants of the front seat of the vehicle than in the normal construction. In addition to this device, I provide the shield 2 with one or more openings 11, and in these openings secure a suitable vision tube 12 having at its inner end a face piece 13 adapted to fit closely around the eyes of the observer and to form a substantially tight or sealed joint at the edges of the face piece. This face piece may be held in position by any suitable means, such for example as a strap 14 adapted to pass around the head of the observer. The tube may comprise transparent material if desired.

Attention is particularly called to the form of the tube 12 illustrated in Figs. 1 and 2, this tube consisting preferably of more or less flexible material made in substantially bellows of accordion form to give flexibility in the direction of the length of the tube as well as transversely, this compensating for the unavoidable relative movement between the head of the observer and the shield 2 and also effectively preventing the collapsing of the tube and the consequent obstruction of the vision of the observer. The device provides a practically unobstructed and clear view for the observer, while preserving the full advantage of the shield both for the observer and the other occupants of the vehicle.

In Figs. 3, 4 and 5, I have illustrated a modified form of the device in which the vision tube 15 is detachably held in the windshield 16. In this instance, the forward end of the tube is secured to a suitably flanged end piece 17, the edges of the flanges 18 being secured in a frame 19, which latter is held behind suitable slides or guides 21, 21 secured to the inside of the shield. The flanges 18 may be flexible to provide for relative movement between the tube 15 and the shield 16, and the inner end of the tube may be provided with a suitable soft face piece 22 similar to the face piece 13 described above. The resiliency in the flanges 18 and in the face piece 22 may be sufficient to provide for the relative movement between the head of the observer and the shield 16, and in this instance the vision tube 15 may be rigid. The frame 19 is insertible behind the guides 21 from above, as clearly illustrated, and when it is desired to detach the tube, the frame may be slid upwardly and withdrawn in obvious manner. The opening in the windshield designated in Fig. 5 by the reference numeral 23 may then be effectively closed by inserting in the slides a glass or other transparent plate 24. In this manner, the vision means may be utilized when desired, and when not in use may be removed and the windshield restored to substantially normal condition.

It will be understood that there may be much modification of the above described devices without departure from the invention.

I claim:

1. In a device for obtaining unobstructed vision from behind windshields and the like, the combination with a shield structure having an opening, of a tube extending from said opening, a face piece at the inner end of said tube adapted to fit snugly against the face of an observer, and means for holding said face piece in place on the head of the observer.

2. In a device for obtaining unobstructed vision from behind windshields and the like, the combination with a shield structure having an unobstructed opening, of a tube embracing and extending from said opening through which an unobstructed view may be had to and through said opening, said tube being shaped at its inner end to fit the face of the observer whereby a substantially tight joint is formed effectively sealing the inner end of the tube.

3. In a device for obtaining unobstructed vision from behind windshields and the like, the combination with a shield structure having an opening, of a pliable tube extending from said opening to the eyes of an observer and adapted to fit the face of the observer.

4. In a device for obtaining unobstructed vision from behind windshields and the like, the combination with a shield structure having an opening, of a longitudinally self-adjustable tube extending from said opening to the eyes of an observer and conformable to relative movements of the said observer's head and the windshield.

5. In a motor vehicle, the combination with a pair of relatively fixed frames arranged in different positions in front of the operator's position, the nearer of said frames containing a transparent shield, and a hood having its open ends secured in said frames and surrounding the space therebetween.

6. In a motor vehicle, the combination with a pair of relatively fixed frames arranged in different positions in front of the operator's position, the nearer of said frames containing an apertured transparent shield, a tube extending from said opening toward the operator's position, and a hood having its open ends secured in said frames and surrounding the space therebetween.

7. In a motor vehicle, the combination with a pair of relatively fixed frames arranged in different positions in front of the operator's position, the nearer of said frames containing an apertured transparent shield, a tube extending from said opening toward the operator's position, and a hood comprising transparent material having its open end secured in said frame and surrounding the space therebetween.

8. In a device for obtaining unobstructed vision from behind windshields and the like, the combination with a shield structure having an unobstructed opening, of a tube comprising transparencies extending from said opening to the eyes of an observer, and means for flexibly connecting the tube to the windshield.

WALTER A. GIBBS.